United States Patent Office 2,933,478
Patented Apr. 19, 1960

2,933,478

POLYURETHANE RESINS FROM LACTONE POLYESTERS

Donald M. Young, New York, N.Y., and Fritz Hostettler, Charleston, W. Va., assignors to Union Carbide Corporation, a corporation of New York No Drawing. Application April 13, 1956
Serial No. 577,951

18 Claims. (Cl. 260—77.5)

This invention relates to resins derived from diisocyanate-modified polyesters, and to a method of preparing the same.

It has been proposed heretofore to prepare elastomers by forming a polyester of a dicarboxylic acid and a diol, e.g., adipic acid and ethylene glycol; lengthening the chain by reacting the terminal active hydrogens of the polyester with a diisocyanate; reacting the resulting polyester-polyurethane diisocyanate with a bifunctional component such as water, glycol, amino alcohol or a diamine to obtain an intermediate gum product and finally subjecting the gum to a final cure by admixture of additional diisocyanate on a cold mill and molding at elevated temperature.

Certain of the polyester-polyurethane elastomers obtained in accordance with these prior art processes are superior to other elastomers such as natural rubber and several of the synthetic rubbers in having better tensile strengths, resistance to swelling in oils or organic solvents, resistance to permeability of gases and to the action of ozone and extraordinarily superior abrasion resistance. With these advantages, however, the polyester-polyurethane elastomers heretofore suggested have the important disadvantage of possessing inferior flexibility at low temperatures as compared with that of natural rubber.

The inability of the heretofore proposed polyester-polyurethane elastomers to flex at low temperatures is important for numerous applications where low temperatures are or may be encountered. Whereas the brittle temperature of natural rubber is of the order of −60 to −70° C., the brittle temperature obtainable heretofore with polyurethane elastomers averaged only about −35° C. This imposes a very considerable limitation upon the uses to which the synthetic product may be applied.

The surprising discovery has now been made that gum stocks and cured elastomers prepared from polyesters that are in effect polymers of one or more lactones or blends of such polymers are remarkably superior to the polyester-polyurethane gum stocks and elastomers heretofore proposed in that they possess surprisingly low brittle temperatures.

The products of the invention are characterized by the presence of linear series of interconnected groups composed of carbon, hydrogen and oxygen. Each series has a terminal carbonyl group at one end and a terminal oxy group at the other end. The terminal carbonyl groups of two series are linked to a bivalent organic radical by means of oxy or amino groups with the formation of ester or amide linkages and the terminal oxy groups of the series are connected to carbonyl groups of isocyanates with the formation of urethane linkages. Each interconnected group in the series is an opened lactone residue comprising an oxy group at one end, a carbonyl group at the other end, and an intermediate chain of at least five methylene groups. The groups are linked together end to end, i.e., the terminal carbonyl group of one is linked to the terminal oxy group of the next, to form a series of interconnected groups.

In the preferred embodiment of the method of the invention, the gum stocks are prepared in three stages and, when required, are cured or converted into elastomers in a fourth stage. The first stage comprises the preparation of a lactone polyester. The second relates to the substantially linear extension of the polyester by reaction with a diisocyanate. The third stage involves a controlled cross-linking of the linear polyester-polyurethane products for forming a gum stock, and the fourth stage is a final curing step for converting the gum stock into a tough elastomer. While it is preferable to carry out these stages successively and more or less separately in order to achieve maximum control over the progress of the reactions and the characteristics of the final products, it is entirely possible and within the scope of the invention to combine several stages, e.g., the second and third, third and fourth, or second, third and fourth stages, to change their order, or to modify them, e.g., by admixing the polyester of the first stage with a bifunctional material before proceeding with the second stage, as demonstrated in a later example.

FIRST STAGE (Polyester preparation)

The preparation of a polyester in the first stage is carried out by reacting a lactone having at least six carbon atoms in the ring with a bifunctional initiator such as a glycol, an amino alcohol or a diamine, as represented in the equation:

(I)

$$m\text{CH}_2(\text{CH}_2)_n\underset{|}{\text{C}}=\text{O} + \text{HZRZH} \longrightarrow$$
$$\phantom{mCH_2(CH_2)_nC}\overline{\phantom{O}}$$

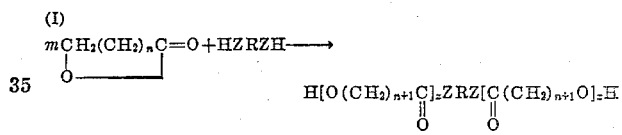

in which R is an organic radical selected from the group consisting of aliphatic, cycloaliphatic, aromatic and heterocyclic radicals, the Z's stand for members selected from the group consisting of —O—, —NH— and —NR'—, R' is a hydrocarbon radical selected from the group consisting of alkyl, aryl, aralkyl and cycloalkyl radicals, $m$ is at least about three, the sum of the $x$'s is equal to $m$, and $n$ is at least four. It is believed that the active hydrogen atoms on the bifunctional initiator open the lactone rings and result in the transfer of the active hydrogen to the end of the opened lactone group, thereby becoming available for successively opening further lactone rings with the result that a readily controllable number of lactones can be condensed on a given bifunctional initiator without forming water of condensation.

The lactones suitable as starting materials in the first stage are those having at least six carbon atoms in the ring. Epsilon-caprolactone having the general formula:

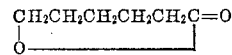

is the most readily available at present and is preferred. Lactones having more than six carbon atoms in the ring, e.g., zeta-enantholactone and eta-caprylolactone, may also be employed.

Bifunctional initiators that are suitable for the purposes of the invention generally include diols, diamines, amino alcohols, and vinyl polymers, as well as amides, sulfonamides, hydrazones, semicarbazones, and oximes.

Diols useful as initiators for reacting with the lactones in the first stage include alkylene glycols of the general formula $HO(CH_2)_n OH$, where $n$ equals 2 to 10, gylcols of the formulae $HO(CH_2CH_2O)_nH$ and

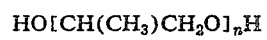

where $n$ equals 1 to 40, 2,2-dimethyl-1,3-propanediol, 2,2 - diethyl - 1,3 - propanediol, 3 - methyl - 1,5 - pentanediol, various cyclohexanediols, 4,4'-methylenebiscyclohexanol, 4,4'-isopropylidenebiscyclohexanol, various xylenediols, various hydroxymethylphenethyl alcohols, various hydroxymethyl-3-phenylpropanols, various phenylenediethanols, various phenylenedipropanols, and various heterocyclic diols such as 1,4-piperazine diethanol.

Other suitable initiators include polyoxyalkylated derivatives of compounds having two reactive hydrogen atoms. These compounds may contain primary or secondary hydroxyls, phenolic hydroxyls, mercapto, amido, sulfonamido, or carboxyl groups and are obtainable by reacting alkylene oxides such as ethylene oxide, propylene oxide, 1-butylene oxide, 2-butylene oxide, isobutylene oxide, butadiene monoxide, styrene oxide, or mixtures of these monoepoxides with such compounds as diols of the class $HO(CH_2)_nOH$, where $n$ equals 2 to 10, propylene glycol, 2,2'-thiodiethanol; phenols such as 4,4'-methylenediphenol, 4,4'-isopropylidenediphenol and resorcinol; mercapto alcohols like 2-mercaptoethanol; dibasic acids such as maleic, succinic, glutaric, adipic, pimelic, sebacic, phthalic hexahydrophthalic and oxy- and thiodivaleric.

Amino alcohols that are useful as intiators include aliphatic amino alcohols of the general formula $$HO(CH_2)_nNH_2$$

where $n$ equals 2 to 10, N-methylethanolamine, isopropanolamine, N - methylisopropanolamine; aromatic amino alcohols like para-amino-phenethyl alcohol and para-amino-alpha-methylbenzyl alcohol; and various cycloaliphatic amino alcohols like 4-aminocyclohexanol.

Among the diamines useful for reaction with the lactones are aliphatic diamines of the general formula $H_2N(CH_2)_nNH_2$, monosecondary diamines of the general formula $R'NH(CH_2)_nNH_2$, and disecondary diamines of the general formula $R'NH(CH_2)_nNHR'$, where $n$ equals 2 to 10, and where $R'$ is alkyl, aryl, aralkyl or cycloalkyl; aromatic diamines like meta-phenylenediamine, para-phenylenediamine, toluene-2,4-diamine, toluene-2,6-diamine, 1,5-naphthalenediamine, 1,8-naphthalenediamine, meta - xylylenediamine, para - xylylenediamine, benzidine, 3,3'-dimethyl-4,4'-biphenylenediamine, 3,3'-dimethoxy-4,4'-biphenylenediamine, 3,3'-dichloro-4,4'-biphenylenediamine, 4,4'-methylenedianiline, 4,4'-ethylenedianiline, 2,3,5,6-tetramethyl-para-phenylenediamine, 2,5-fluorenediamine, and 2,7-fluorenediamine; cycloaliphatic diamines such as 1,4-cyclohexanediamine and 4,4'-methylenebiscyclohexylamine; and heterocyclic diamines such as piperazine and 2,5-dimethylpiperazine.

Further useful bifunctional initiators are polymers of monoepoxides obtainable by polymerizing with such catalysts as oxonium salts of hydrogen halides; metal or non-metal halides whose etherates are oxonium complexes; electrophilic metal or non-metal halides in the presence of hydrogen halides, acyl halides, or anhydrides of organic and inorganic acids; and inorganic acids and anhydrides thereof whose anions show little tendency to polarize. Polymers containing hydroxyl end-groups may be obtained by treating these products with alkaline reagents upon completion of the polymerization reaction. Among suitable monoepoxides for preparing such polymers are tetrahydrofuran, trimethylene oxide, propylene oxide, ethylene oxide, or mixtures thereof.

To initiate and continue the polymerization of the lactone, the lactone and the polyfunctional initiator are preferably heated to a temperature between about 120 and 200° C. in order to achieve a practical and desirable rate of reaction with a minimum of decomposition. The temperature may be considerably lower however, i.e., as low as about 50° C. at the sacrifice of speed of reaction. It may also be considerably higher, i.e., up to about 300° C., although care must be taken at such higher temperatures because of the more likely losses, at temperatures above 250° C., due to decomposition or undesirable side reactions. Generally, therefore, a temperature range of 50 to 300° C. is considered operable and a more limited range between about 120 and 200° C. is considered preferable.

The polymerization may be, and preferably is, accelerated by including minor amounts, ranging from as low as 0.001% to as high as about 0.5% by weight, of catalyst in the reaction mixture. A wide variety of catalysts may be employed for this purpose. These include particularly basic and neutral, as well as acidic, ester interchange catalysts.

The basic and neutral ester interchange catalysts, which are preferred because they have no tendency to form a non-reactive site in the polyester molecule, include the metals lithium, sodium, potassium, rubidium, caesium, magnesium, calcium, barium, strontium, zinc, aluminum, cobalt, titanium, germanium, tin, lead, antimony, arsenic and cerium, as well as the alkoxides thereof, the carbonates of the alkali- and alkaline earth metals, organic tin oxides and titanates, titanium chelates and acylates, litharge, zinc oxide, antimony trioxide, germanium dioxide, cerium trioxide, cobaltous acetate, zinc borate and lead salts generally.

Monocarboxylic acids, which have catalytic activity in opening the lactone ring and promoting their polymerization but are not preferred because they tend to acylate the reactive terminal hydroxyl groups of a polyester, include acetic acid and other aliphatic monocarboxylic acids up to and including hexanoic acid as well as derivatives thereof such as 2-ethylhexanoic acid. It is recommended, if a monocarboxylic acid is used as a catalyst, that it be used in amounts within the lower portion of the range specified, i.e., in an amount of the order of 0.001% and not exceeding about 0.5% by weight.

Dicarboxylic acids, such as succinic, maleic, glutaric, adipic, sebacic, and phthalic acids, may also be used to catalyze the polymerization reaction, although they tend to introduce carboxyl end-groups into the polyester. Among other suitable catalysts are hydrochloric acid, sulfuric acid, phosphoric acid, zinc chloride, aluminum trichloride, tin dichloride, tin tetrachloride, and boron trifluoride. However, when strongly acidic components are employed as catalysts, the reaction temperature should preferably be kept low, e.g., at 50–150° C., in order to prevent excessive dehydration during the polymerization reaction. Furthermore, it is advantageous to neutralize acidic catalysts prior to conducting reaction stage two.

The duration of the polymerization varies from about a few minutes to about a week depending upon the lactone or mixtures of lactones selected, the initiator, the reaction temperature and the catalyst, if one is present.

While it is by no means essential, we have found it preferable to conduct the reaction in the absence of oxygen, e.g., under an inert atmosphere by passing an inert gas such as nitrogen through the reaction mixture or by operating in a partial vacuum. This procedure has the advantage of resulting in a polyester of better color than is otherwise obtainable. After the polymerization, any monomer remaining in the polymer may readily be removed by stripping under a vacuum at an elevated temperature, e.g., at 1 to 5 mm. mercury and temperatures of the order of 120–160° C. The amount of monomer normally subject to removal is minute.

It is apparent from Equation I above that the preparation of the polyester in the first stage of the method of this invention has the unique advantage of permitting accurate control over the average molecular weight of the polyester, and further of promoting the formation of a substantially homogeneous polyester in which the molecular weights of the individual molecules are substantially all very close to the average molecular weight. This control, as is evident from Equation I, is obtained by preselecting the molar proportions of lactone and bifunctional initiator in a manner that will readily be appreciated by those skilled in the art. Thus, for example, if it is desired to form a polyester in which the average molecular weight is approximately twenty times the molecular weight of the initial lactone or lactone mixture, then the proportions of lactone to initiator utilized in the polymerization are fixed at approximately 20:1 inasmuch as it is to be expected that on the average each molecule of initiator will add on an approximately equal number of lactones and an average of twenty lactone molecules would be available to each molecule of initiator.

A convenient method of measuring the molecular weight of the polyester formed in the first stage is to determine the average number of carboxyl and hydroxyl groups in a given amount of the linear polyester. The acid number (milligrams of KOH per gram of polyester using phenolphthalein as an indicator) is a measure of the number of terminal carboxyl groups in a polyester. In the polyesters produced in stage I the acid or carboxyl number is ordinarily and inherently very close to zero. It should not, however, exceed ten. The hydroxyl number, which is a measure of the number of terminal hydroxyl groups and is defined in terms of milligrams of KOH per gram of polyester, is determined by adding pyridine and acetic anhydride to the polyester and titrating the acetic acid formed with KOH as described in Ind. Eng. Chem., Anal. Ed., vol. 16, pages 541–49 and in Ind. Eng. Chem., Anal. Ed., vol. 17, page 394. The sum of the acid or carboxyl number and the hydroxyl number, referred to as the reactive number, is an indication of the average number of terminal groups present in the polyester and therefore is in turn an indication of the number of molecules in the mass and the degree of polymerization. A polyester containing long chain molecules will have a relatively low reactive number while a polyester containing short chain molecules will possess a relatively high reactive number.

We prefer to select our starting lactones and initiator and their relative proportions so as to produce polyesters having a carboxyl number as low as possible and certainly no greater than ten and a hydroxyl number between about forty and about sixty so that the average molecular weight of the polyester will be in the range of about 1900 to 2800. This range of molecular weights is preferred because it yields linearly extended polyester-polyurethane diisocyanate chains of optimum length in the second stage and promotes the eventual formation of an elastomer having optimum properties of low brittle temperature and high tensile strength. It is to be understood, however, that substantial departures can be made from this range of molecular weights, i.e., to as low as about 300 (corresponding to a hydroxyl number of 374) if more rigid properties are desired and to as high as 5000 and even 7000 (corresponding to a hydroxyl number of 16) if greater elasticity is more important than high tensile strength.

One of the outstanding advantages of the method of the invention, as distinguished from the superior brittle temperatures of the products obtained thereby, is that the preparation of the polyesters is one that is inherently capable of being carried out under substantially anhydrous conditions whereas conventional methods of preparing polyesters, e.g., by condensation of dicarboxylic acids with a glycol, diamine or amino alcohol, results in a splitting off of water which requires considerable care to remove. It is important that the polyester utilized in the second stage of the process be in a substantially anhydrous condition if the formation of bubbles or premature cross-linking is to be avoided. The polyesters produced in the first stage of this process are stable and may be maintained in a substantially anhydrous condition with relatively little difficulty.

SECOND STAGE (*Linear extension*)

We have found it advantageous to extend the linear polyester obtained in the first stage by reacting, after careful removal of any traces of moisture, the terminal hydroxyl groups with an excess of diisocyanate, as represented by the following reaction:

(II)

HO(PE)OH + excess Y(NCO)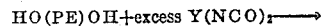 ⟶

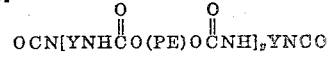

OCN[YNHCO(PE)OCNH]<sub>y</sub>YNCO in which HO(PE)OH is an abbreviated representation for the polyester bearing terminal hydroxyl groups as formed in the first stage, Y stands for a member selected from the group consisting of bivalent aliphatic, aromatic and cycloaliphatic radicals, and y is an average of at least one.

It will be noted from Equation II that the use of an excess of diisocyanate provides an efficient means of control over the degree of linear extension and conjugation of the polyester-polyurethane molecule. If the proportions of polyester and diisocyanate are chosen so that the number of reactive hydroxyl groups on the polyester are equal to the number of reactive isocyanate groups on the diisocyanate, extremely long, high molecular weight chains would be formed. The resulting polymer would have a sharp melting point, retain its original solubility properties, and be capable of being drawn into filaments. By utilizing an optimum excess of about 30 to 60% diisocyanate however, close control is maintained over the length of the polyester-polyurethane molecule and in the formation of a polyester-polyurethane diisocyanate having the most desirable characteristics for the production, at a later stage, of a rubbery polymer which softens gradually over a wide range of temperature and is not subject to cold drawing. A greater excess, up to several hundred percent, of diisocyanate is desirable if the desideratum is a more rigid type of polyurethane product.

The reaction of the polyester with the diisocyanate can take place at temperatures varying from room temperature to above 300° C. The preferred temperature is in the range of about 100–150° C., the upper limit of the reaction temperature being selected on the basis of the thermal stability of the reaction products and of the diisocyanates, and the lower limit being determined by the lowest economical rate of reaction. Below 75° C. the rate of reaction is too slow to be practicable unless a catalyst is employed, and above about 300° C. there is danger of destructive decomposition of the reactants and reaction product.

The time of reaction may vary from several minutes to as much as a day depending upon the reaction temperature and the identity of the particular polyester and diisocyanate as well as upon the absence or presence of accelerator or retarder and the identity thereof. Most desirably, conditions are adjusted so as to provide a controllable reaction that is completed in about ten to sixty minutes.

If desired, the reaction may be accelerated by employing catalysts such as inorganic bases and particularly tertiary organic bases such as tertiary amines and phosphines. Among the latter are N,N'-dimethylaniline, N,N'-dimethylhexahydroaniline, N,N'-dimethylpiperazine, N-methylmorpholine, tribenzylamine, N,N-dimethylbenzylamine, triethylamine, trialkyl phosphines, dialkylphenyl phosphines, alkyldiphenyl phosphines, etc. Catalyst concentrations may be varied considerably. Concentrations between about .001 and .5%, based on the weight of the total ingredients, have been found sufficient.

Among the retarders suitable for the polyester-diisocyanate reaction are acids such as hydrochloric acid, sulfuric acid, phosphoric acid, boric acid, and organic acids; acyl halides such as acetyl chloride and acetyl bromide; sulfonyl halides such as para-toluenesulfonylchloride; inorganic acid halides like phosphorous tribromide, phosphorous trichloride, phosphorous oxychloride, sulfuryl chloride, and thionyl chloride; and sulfur dioxide or acidic sulfones. The addition of a retarder is desirable in some instances not only in order to slow down as the name implies, the rate of reaction between terminal hydroxyl and isocyanate groups, but also for inhibiting reaction between the isocyanate groups and the urethane groups formed in the second stage.

If the starting polyester from the first stage contains alkaline reacting materials, it should be neutralized or acidified slightly by addition of acids or acid chlorides. For instance, polyethylene oxides are prepared by catalyzing the ethylene oxide polymerization with sodium or potassium hydroxide or other basic catalysts. If these polyethylene oxides are employed as initiators for the lactone polymerization, the resulting polyether-ester contains some sodium or potassium carboxylate end-groups which are efficient catalysts for the isocyanate reaction in stage two. In order to prevent almost instantaneous or premature cross-linking in stage two (a procedure which yields inferior elastomers), the polyether-ester product should be neutralized or slightly acidified.

The chain lengthening reaction of the polyester with the diisocyanate may be carried out with a wide variety of aliphatic, cycloaliphatic or aromatic diisocyanates, the aromatic diisocyanates being most suitable because of their greater reactivity. Among the various diisocyanates useful in this reaction are m- and p-phenylene diisocyanates, 2,4- and 2,6-tolylene diisocyanates, 2,3,5,6-tetramethyl-para-phenylene diisocyanate, m-xylylene diisocyanate, 4,4'-biphenylene diisocyanate, 3,3'-dimethyl-4,4'-biphenylene diisocyanate, 3,3'-dimethoxy-4,4'-biphenylene diisocyanate, p,p'-bibenzyl diisocyanate, p,p'-diphenyl-methane diisocyanate, 4,4'-methylene bis ortho tolyl isocyanate, 1,5-naphthalene diisocyanate, fluorene diisocyanates, pyrene diisocyanates, chrysene diisocyanates, etc. The table in the publication of Siefken (Annalen, 562, pages 122–135 (1949)), lists numerous other diisocyanates which are useful for performing this reaction.

THIRD STAGE

*(Gum stock preparation)*

In order to further extend the polyester-polyurethane diisocyanates obtained in the second stage and also to bring about a cross-linking of the molecules, the polyester-polyurethane is reacted with a polyfunctional, preferably a bifunctional reactant. Such a further chain lengthening reaction is illustrated in Equation III below with three mols of an amino alcohol and two mols polyester-polyurethane diisocyanate, abbreviated for purposes of clarity as OCN(PE—PU)NCO to indicate the reactive terminal isocyanate groups obtained by using an excess of diisocyanate in stage two, to show the reactions of hydroxyl and amino groups of a bifunctional reactant.

(III)

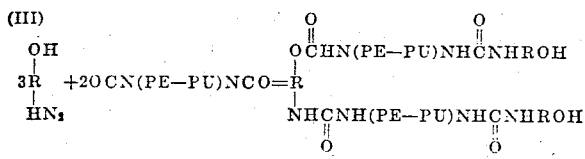

It will be evident from Reaction III that the hydroxyl group of a bifunctional reactant in this stage reacts with a terminal isocyanate group to form a urethane group —OOCNH— and that the amino group of a bifunctional reactant does so by forming a urea group —HNCONH—. There is reason to believe that, simultaneously with Reaction III, the reaction products of Reaction III and free diisocyanates react to effect a cross-linking. These reactions can take place in many ways. Thus, for example, a terminal isocyanate group can react with a reactive hydrogen of (a) an amide group of a stage two product prepared initially with an amine or amino alcohol to form an acyl urea cross link, (b) a urethane group of a stage two product or a stage three product prepared with a hydroxyl group-containing reactant to form an allophanic ester cross link, and (c) a urea group of a stage three product prepared with an amino group-containing reactant to form a biuret cross link. Some of these reactions may also take place, albeit at a much reduced rate, before the addition of a polyfunctional reactant in the third stage, because of the formation of a number of urethane groups in the second stage and their ability to enter into slow cross linking reaction with terminal isocyanate groups.

The reactant with which the polyester-polyurethane diisocyanate from the second stage is reacted in this stage is preferably a bifunctional compound such as a glycol, an amino alcohol, or a diamine. It is entirely within the scope of the method of the invention, however, to utilize in this stage higher functional reactants having three or even more reactive hydroxyl or amino groups and furthermore to utilize such reactants as water and others containing carboxylic acid groups.

Substantially all of the bifunctional reactants that are useful in the first stage are also useful in this stage. It is inadvisable however, where high tensile strength of the final product is desirable, to use those of higher molecular weight than, for example, polyoxyalkylene compounds of the formulae $HO(CH_2CH_2O)_nH$ and

$HO[CH(CH_3)CH_2O]_nH$ where $n$ is greater than about six. Among the bifunctional reactants found to be particularly suitable alone or in admixture with one another in this stage are ethylene glycol, trimethylene glycol, 1,4-butynediol, 1,4-butenediol, tetramethylene glycol, pentamethylene glycol, hexamethylene glycol, decamethylene glycol, quinitol, ethanolamine, 3-aminopropanol, 4-aminobutanol, 5-aminopentanol, 6-aminohexanol, p-aminobenzyl alcohol, m-amino-alpha-methylbenzyl alcohol, p-aminophenylethyl alcohol, ethylenediamine, trimethylenediamine, tetramethylenediamine, pentamethylenediamine, hexamethylenediamine, decamethylenediamine, m-phenylenediamine, 2,4-tolylenediamine, p-phenylenediamine, 4,4'-biphenylenediamine, 3,3'-dichloro-4,4'-biphenylenediamine, 3,3'-dimethyl-4,4'-biphenylenediamine, 3,3'-dimethoxy-4,4'-biphenylenediamine, p,p - bibenzyldiamine, p,p' - diphenylmethanediamine, 2,5- and 2,7-fluorenediamines, 3,8- and 3,10-pyrenediamines, piperazine, various methyl-, and polymethylpiperazines. Bifunctional reactants of this type are preferred in this stage of the process for the reason that they act as chain extenders without forming carbon dioxide bubbles in the mass.

Where elasticity of the gum stock and final resin is not an object and rigidity is permissible or desirable, it is feasible to employ in this stage higher molecular weight bifunctional reactants and such polyfunctional materials as polyols and polyamines, e.g., 1,2,4-butanetriol, 1,2,6-hexanetriol, glycerol, trimethylolpropane, trimethylolethane, pentaerythritol, diethanolamine, diisopropanolamine, 2-(2-aminoethylamino)ethanol, diethylenetriamine, and triethylenetetramine.

Such agents as water and carboxylic acid are also operable and in fact desirable where the production of a foamed product is the ultimate objective and where preparation of a storable gum stock is not required. If desired, foam-producing $CO_2$ bubbles can be removed by milling or other processes.

While Reaction III is shown, for illustrative purposes only, as involving three mols of a bifunctional reactant and two mols of a polyester-polyurethane diisocyanate, i.e., a 50% excess of a bifunctional reactant, the amount of bifunctional employed for optimum results is within the range of 1 to 20% excess. The use of more than 20% excess results in a system that is generally more rigid than desirable for the production of elastomeric materials and the use of an equivalent or less than equivalent amount of bifunctional results in a completely cross-linked system which ceases to be a gum-stock. It is to be understood, therefore, that while a 1 to 20% excess of bifunctional reactant is recommended for the third stage, departures from this amount in order to obtain more rigid or more completely cross-linked systems are not outside the scope of the invention.

The reaction of the polyester-polyurethane diisocyanate with polyfunctional reactant can be carried out at a temperature ranging from room temperature to over 200° C. Temperatures of the order of 100–150° C. are preferred. The time of reaction may vary from several minutes to one day depending upon the reaction temperature. If desired, a catalyst similar to that employed in the second stage may be used in like amounts.

FOURTH STAGE
(Cure)

The final curing is carried out with a polyisocyanate, preferably an aromatic polyisocyanate. While the polyisocyanate employed in the final cure may, if desired, be the same or a different diisocyanate as compared with that used in the second stage, it may also be a tri- or higher functional isocyanate. One of the more attractive types of polyisocyanate useful in the fourth stage is the product

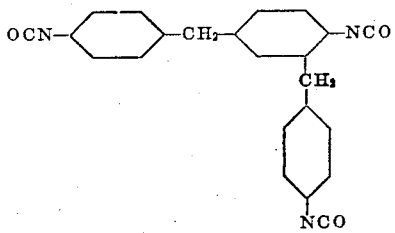

as well as the isomers thereof, obtainable by phosgenation of the reaction product of aniline and formaldehyde.

In the preferred embodiment of the invention, approximately 3 to 7% by weight, based on the weight of gum stock, of additional polyisocyanate is admixed with the gum stock on a conventional rubber mill or in any suitable mixing device and the mixture is cured in the mold at a temperature preferably of the order of about 140–160° C. in a few minutes. If a longer molding time than fifteen minutes is not objectionable, the temperature of the cure may be considerably lower, e.g., as low as about 100° C. In the mold, the cure is accomplished apparently by a reaction of excess amino or hydroxyl groups with the newly admixed polyisocyanate, and secondly by reaction of the remaining free terminal isocyanate groups with hydrogen atoms of the urea and urethane groups to form a strongly cross-linked polymer.

By this procedure, elastomers possessing excellent tensile strength and exceptional low brittle temperature are obtained.

A considerable number of modifying agents may be added to the elastomer at any stage of its production after the formation of the polyester. These materials include fillers such as carbon blacks, various clays, zinc oxide, titanium dioxide, and the like; various dyes; plasticizers such as polyesters which do not contain any reactive end-groups stearic and other fatty acids, organic esters of stearic and other fatty acids, metal salts of fatty acids, dioctyl phthalate, tetrabutylthiodisuccinate, and the like. It is also possible to include releasing agents such as mold release agents that are sometimes very helpful in the processing of the elastomeric compositions. Among those useful for this purpose are films of "Teflon" or fluorothene resins, silicone oils, fluorothene oils, polyethylene greases, paraffin waxes, petroleum jelly, "Carbowaxes," mineral oils, vegetable oils, and the like.

The advantages and utility of the method and products of the invention will become further apparent from the following detailed examples included for illustrative purposes only and showing the best mode contemplated at present for carrying out the invention.

EXAMPLE 1

100 grams of epsilon-caprolactone and 4.3 grams of tetramethylene glycol were heated under nitrogen for forty-eight hours at 180° C. in the presence of 0.01 gram potassium carbonate as catalyst. Thereafter a vacuum of a few millimeters mercury was applied, but no monomer could be recovered. The resulting solid polyester had a hydroxyl number of 62.3 and an estimated molecular weight of approximately 1800.

This polyester (97 grams) was reacted at 120–140° C. for ten minutes with 20.3 grams of p,p'-diphenylmethane diisocyanate. After the reactants had cooled to 120° C., two grams of ethanolamine were added and the mixture was stirred for fifteen minutes. The resulting elastomeric gum stock was then milled on a rubber mill while adding 3% by weight of 4,4'-biphenylene diisocyanate. This material was then molded into a disc having a thickness of 0.07" by heating under pressure for thirty minutes at 160° C. The cured elastomer had the following physical properties:

Tensile strength, p.s.i. _____ 2560
Elongation, percent _____ 815
Brittle temperature, ° C. _____ −70
Hardness, Shore "A" _____ 40

EXAMPLE 2

200 grams of epsilon-caprolactone were heated with 6.2 grams ethylene glycol under nitrogen for forty hours at 170° C. After this time, no monomer could be recovered. The resulting polyester was a solid, wax-like material having a hydroxyl number of 54.4, a carboxyl number of 1.0 and a molecular weight of approximately 2000.

This polyester (181 grams) was heated to 120–145° C. with 33 grams of p,p'-diphenylmethane diisocyanate. After the reactants had cooled to 120° C., 3.25 grams of ethanolamine were added and the mixture was stirred until an elastomeric gum stock was obtained. This elastomeric product was milled into a thin sheet on a rubber mill.

A portion of the gum stock was cured in a mold for fifteen minutes at 160° C., after admixture of 5% by weight of p,p'-diphenylmethane diisocyanate and .033% N,N-dimethyl-benzylamine as catalyst. This material was molded into a disc of 0.07" thickness by heating under pressure for fifteen minutes at 160° C. The cured elastomer exhibited the following physical properties:

Tensile strength, p.s.i. _____ 4230
Elongation at break, percent _____ 500
Load at 300% elongation, p.s.i. _____ 800
Brittle temperature, ° C. _____ −74
Hardness, Shore "A" _____ 75

EXAMPLE 3

200 grams of epsilon-caprolactone and 6.2 grams of ethylene glycol were heated at 170° C. for forty hours in the presence of 0.05 gram calcium. After this time, no monomers could be recovered under vacuum. The resulting polyester was a wax-like solid having a hydroxyl number of 56.8 and a carboxyl number of 1.0.

181 grams of this polyester were reacted with 34.4 grams of p,p'-diphenylmethane diisocyanate at 130–145° C. in the presence of 0.1 gram of N,N-dimethylbenzylamine as catalyst. After the reactants had cooled to 130° C., 3.4 grams ethanolamine were added and the mixture was stirred until an elastomeric gum stock was obtained.

To two portions of this elastomer, the following ingredients were added on a rubber mill:

Sample A—
　5% by weight of p,p'-diphenylmethane diisocyanate;
　.033% by weight of N,N-dimethylbenzylamine;
　1% by weight of ethyl oleate (plasticizer).
Sample B—
　5% by weight of p,p'-diphenylmethane diisocyanate;
　No catalyst.

The resulting materials were then molded into a disc of 0.07" thickness by heating under pressure for fifteen minutes at 160° C. The cured elastomers possessed the following physical properties:

|  | Sample A | Sample B |
|---|---|---|
| Tensile Strength, p.s.i. | 3,250 | 3,700 |
| Elongation at Break, Percent | 500 | 480 |
| Load at 300% Elongation, p.s.i. | 450 | 500 |
| Brittle Temperature, ° C. | −75 | −76 |
| Hardness—Shore "A" | 61 | 83 |

EXAMPLE 4

500 grams of epsilon-caprolactone, 15.5 grams of ethylene glycol and 0.25 gram of N,N-dimethylbenzylamine were heated at 170° C. under nitrogen for fifty hours. The resulting solid polyester had a hydroxyl number of 57.3 and a carboxyl number of 0.7.

200 grams of this polyester were reacted with 39.3 grams of p,p'-diphenylmethane diisocyanate at 130–140° C. After the reactants had cooled to 130° C., 3.8 grams of ethanolamine were added and the mixture was stirred until an elastomeric product was obtained.

To two portions of this elastomer, the following ingredients were added on a rubber mill:

Sample A—5% by weight of 4,4'-biphenylene diisocyanate;

Sample B—5% by weight of p,p'-diphenylmethane diisocyanate.

The resulting materials were molded into discs of 0.07" thickness by heating under pressure for fifteen minutes at 160° C. The cured elastomers possessed the following physical properties:

|  | Sample A | Sample B |
|---|---|---|
| Tensile Strength, p.s.i. | 2,600 | 2,500 |
| Elongation at Break, Percent | 500 | 485 |
| Load at 300% Elongation, p.s.i. | 525 | 400 |
| Brittle Temperature, ° C. | below −77 | below −77 |
| Hardness | 64 | 60 |

EXAMPLE 5

1682 grams of epsilon-caprolactone and 48.8 grams of ethylene glycol were heated at 170° C. under nitrogen for forty-six hours. The resulting solid polyester had a hydroxyl number of 44.8 and a carboxyl number of 1.4.

300 grams of this polyester were reacted with 50.2 grams of 3,3'-dimethyl-4,4'-biphenylene diisocyanate at 130–135° C. After the reactants had cooled to 130° C., 4.63 grams of ethanolamine were added and the mixture was stirred until an elastomeric product was obtained.

To two portions of this elastomer, the following ingredients were added on a rubber mill:

Sample A—3% by weight of 3,3'-dimethyl-4,4'-biphenylene diisocyanate;

Sample B—5% by weight of 3,3'-dimethyl-4,4'-biphenylene diisocyanate.

The resulting materials were molded into discs of 0.07" thickness by heating under pressure for fifteen minutes at 160° C. The cured elastomers possessed the following physical properties:

|  | Sample A | Sample B |
|---|---|---|
| Tensile Strength, p.s.i. | 3,000 | 3,680 |
| Elongation at Break, Percent | 825 | 680 |
| Load at 300% Elongation, p.s.i. | 450 | 625 |
| Brittle Temperature, ° C. | below −76 | below −76 |
| Hardness | 59 | 62 |
| Abrasive Wear Factor | 33 | 50 |

Abrasive wear factor of typical natural rubber composition: 434.
Abrasive wear factor of cold GRS composition: 148.

The abrasive wear factor in this example was determined with the "Taber" abrader, using the wheel H 18 at 1000 gram load.

EXAMPLE 6

300 grams of the polyester described in Example 5 were reacted with 56.3 grams of 3,3'-dimethoxy-4,4'-biphenylene diisocyanate at 130–135° C. After the reactants had cooled to 130° C., 4.7 grams of ethanolamine were added and the mixture was stirred until an elastomeric product was obtained.

To a portion of this elastomer 3% by weight of 3,3'-dimethoxy-4,4'-biphenylene diisocyanate was added on a cold rubber mill. The resulting material was molded into a disc of 0.07" thickness by heating under pressure for fifteen minutes at 160° C. The cured elastomer possessed the following physical properties:

Tensile strength, p.s.i. _____ 2280
Elongation at break, percent _____ 650
Load at 300% elongation, p.s.i. _____ 600
Brittle temperature, ° C. _____ −68
Hardness _____ 75

484.5 grams of epsilon-caprolactone, 15.5 grams of ethylene glycol and 0.06 gram of sulfuric acid (98%) were heated at 120° C. under nitrogen for ten hours. The resulting polyester had a hydroxyl number of 46.5.

100 grams of this polyester were reacted with 3,3'-dimethyl-4,4'-biphenylene diisocyanate at 125° C. for twenty minutes. 1.91 grams of ethanolamine were added and the mixture was stirred for fifteen minutes whereupon an elastomeric product resulted.

To a portion of this elastomer 5% by weight of 3,3'-dimethyl-4,4'-biphenylene diisocyanate was added on a cold rubber mill. The resulting material was molded into a disc of 0.07" thickness by heating under pressure for fifteen minutes at 160° C. The cured elastomer exhibited the following physical properties:

Tensile strength, p.s.i. _____ 2380
Elongation at break, percent _____ 525
Load at 300% elongation, p.s.i. _____ 950
Brittle temperature, ° C. _____ −65
Hardness _____ 65

EXAMPLE 8

600 grams of epsilon-caprolactone, 33.4 grams of hexamethylenediamine and 0.3 gram of dibutyltin oxide were heated at 170° C. under nitrogen for twenty-four hours. The resulting polyester was a waxy solid having a hydroxyl number of 47.1, a carboxyl number of 1.1 and a molecular weight of about 2270.

To 250 grams of this polyester, 0.3 gram of acetyl chloride were added in order to retard the subsequent isocyanate reaction. 43.7 grams of 3,3'-dimethyl-4,4'-biphenylene diisocyanate were then added and the reaction was allowed to proceed at 120–130° C. After the reactants had cooled to 120° C., 4.1 grams of ethanolamine were added and the mixture was stirred until an elastomeric gum stock was obtained.

To a portion of this gum stock 5% by weight of 3,3'-dimethyl-4,4'-biphenylene diisocyanate was admixed on a rubber mill. The resulting product was molded into a disc of 0.07" thickness by heating under pressure for fifteen minutes at 160° C. The cured elastomer possessed the following physical properties:

Tensile strength, p.s.i. _____ 3210
Elongation at break, percent _____ 515
Load at 300% elongation, p.s.i. _____ 1190
Brittle temperature, ° C. _____ Below −76
Hardness _____ 62

EXAMPLE 9

600 grams of epsilon-caprolactone, 41 grams of meta-amino-alpha-methylbenzyl alcohol, and 0.3 gram of dibutyltin oxide were heated at 170° C. under nitrogen for twenty-four hours. The resulting polyester was a brown waxy solid having a hydroxyl number of 50.4, a carboxyl number of 0.8, and a molecular weight of about 2150.

To 250 grams of this polyester, 0.3 gram of acetyl chloride were added in order to retard the subsequent isocyanate reaction. 46.2 grams of 3,3'-dimethyl-4,4'-biphenylene diisocyanate were then added and the reaction was allowed to proceed at 115–130° C. After the reactants had cooled to 120° C., 4.3 grams of ethanolamine were added and the mixture was stirred until an elastomeric gum stock resulted.

To two portions of the above gum stock, the following ingredients were added on a rubber mill:

Sample A—5% by weight of 3,3'-dimethyl-4,4'-biphenylene diisocyanate;
Sample B—7% by weight of 3,3'-dimethyl-4,4'-biphenylene diisocyanate.

These mixtures were molded into discs of 0.07" thickness by heating under pressure for fifteen minutes at 160° C. The cured elastomers possessed the following physical properties:

|  | Sample A | Sample B |
| --- | --- | --- |
| Tensile Strength, p.s.i. | 3,170 | 3,400 |
| Elongation at Break, Percent | 390 | 370 |
| Load at 300% Elongation, p.s.i. | 1,650 | 2,100 |
| Brittle Temperature, ° C. | below −74 | below −74 |
| Hardness | 70 | 68 |

EXAMPLE 10

600 grams of epsilon-caprolactone, 17.1 grams of ethanolamine, and 0.3 gram of dibutyltin oxide were heated at 170° C. under nitrogen for twenty-four hours. The resulting polyester was a brown waxy solid having a hydroxyl number of 47.9, a carboxyl number of 1.1, and a molecular weight of about 2240.

To 250 grams of this polyester, 0.3 gram of acetyl chloride were added in order to retard the subsequent isocyanate reaction. 44.3 grams of 3,3'-dimethyl-4,4'-biphenylene diisocyanate were then added and the reaction was allowed to proceed at 115–130° C. After the reactants had cooled to 120° C., 4.1 grams of ethanolamine were added and the mixture was stirred until an elastomeric gum stock resulted.

To two portions of this gum stock, the following ingredients were added on a rubber mill:

Sample A—5% by weight of 3,3'-dimethyl-4,4'-biphenylene diisocyanate;
Sample B—7% by weight of 3,3'-dimethyl-4,4'-biphenylene diisocyanate.

These mixtures were molded into discs of 0.07" thickness by heating under pressure for fifteen minutes at 160° C. The cured elastomers exhibited the following physical properties:

|  | Sample A | Sample B |
| --- | --- | --- |
| Tensile Strength, p.s.i. | 3,620 | 4,300 |
| Elongation at Break, Percent | 480 | 415 |
| Load at 300% Elongation, p.s.i. | 1,525 | 2,100 |
| Brittle Temperature, ° C. | below −76 | below −76 |
| Hardness | 62 | 63 |

EXAMPLE 11

600 grams of epsilon-caprolactone, 59.5 grams of 4,4'-methylenedianiline and 0.3 gram of dibutyltin oxide were heated at 170° C. under nitrogen for twenty-four hours. The resulting polyester was a brown waxy solid having a hydroxyl number of 47.0, a carboxyl number of 0.8, and a molecular weight of about 2310.

To 250 grams of this polyester, 0.3 gram of acetyl chloride were added in order to retard the subsequent isocyanate reaction. 42.9 grams of 3,3'-dimethyl-4,4'-biphenylene diisocyanate were then added and the mixture was stirred until an elastomeric gum stock was obtained.

To two portions of this gum stock, the following ingredients were added on a rubber mill:

Sample A—5% by weight of 3,3'-dimethyl-4,4'-biphenylene diisocyanate;
Sample B—7% by weight of 3,3'-dimethyl-4,4'-biphenylene diisocyanate.

These mixtures were molded into discs of 0.07" thickness by heating under pressure for fifteen minutes at 160° C. The cured elastomers exhibited the following physical properties:

|  | Sample A | Sample B |
| --- | --- | --- |
| Tensile Strength, p.s.i. | 4,225 | 4,250 |
| Elongation at Break, Percent | 400 | 325 |
| Load at 300% Elongation, p.s.i. | 1,825 | 3,500 |
| Brittle Temperature, ° C. | below −76 | below −76 |
| Hardness | 63 | 65 |

EXAMPLE 12

1000 grams of epsilon-caprolactone, 29 grams of ethylene glycol and 0.5 gram of dibutyltin oxide were heated at 170° C. under nitrogen for twenty-four hours. The resulting polyester was a white waxy solid having a hydroxyl number of 47.3, a carboxyl number of 0.8, and a molecular weight of about 2290.

250 grams of this polyester were reacted at 115–130° C. with 43.4 grams of 3,3'-dimethyl-4,4'-biphenylene diisocyanate. After the reactants had cooled to 120° C., 7.65 grams of quinitol were added and the reactants were stirred until an elastomeric gum stock was obtained.

To a portion of this gum stock 5% by weight of 3,3'-dimethyl-4,4'-biphenylene diisocyanate was added on a rubber mill. This mixture was molded into a disc of 0.07" thickness by heating under pressure for fifteen minutes at 160° C. The cured elastomer exhibited the following physical properties:

Tensile strength, p.s.i. _____ 3000
Elongation at break, percent _____ 485
Load at 300% elongation, p.s.i. _____ 1350
Brittle temperature, ° C. _____ −55
Hardness _____ 87

EXAMPLE 13

250 grams of the polyester described in Example 12 were reacted with 43.4 grams of 3,3'-dimethyl-4,4'-biphenylene diisocyanate at 115–130° C. After the reactants had cooled to 120° C., 5.93 grams of 1,4-butanediol were added and the reactants were stirred until an elastomeric gum stock was obtained.

To two portions of this gum stock, the following ingredients were added on a rubber mill:

Sample A—5% by weight of 3,3'-dimethyl-4,4'-biphenylene diisocyanate;
Sample B—7% by weight of 3,3'-dimethyl-4,4'-biphenylene diisocyanate.

These mixtures were molded into discs of 0.07" thickness by heating under pressure for fifteen minutes at 160° C. The cured elastomers possessed the following physical properties:

|  | Sample A | Sample B |
| --- | --- | --- |
| Tensile Strength, p.s.i. | 2,275 | 4,350 |
| Elongation at Break, percent | 450 | 535 |
| Load at 300% Elongation, p.s.i. | 1,100 | 1,400 |
| Brittle Temperature, ° C. | below −76 | below −76 |
| Hardness | 68 | 70 |

EXAMPLE 14

242 grams of the polyester described in Example 13 were reacted with 41.9 grams of 3,3'-dimethyl-4,4'-biphenylene diisocyanate at 115–130° C. After the reactants had cooled to 120° C., 8.7 grams of m-aminoalpha-methylbenzyl alcohol were added and the mixture was stirred until an elastomeric gum stock resulted.

To two portions of this gum stock, the following ingredients were admixed on a rubber mill:

Sample A—5% by weight of 3,3'-dimethyl-4,4'-biphenylene diisocyanate;
Sample B—7% by weight of 3,3'-dimethyl-4,4'-biphenylene diisocyanate The above mixtures were molded into discs of 0.07" thickness by heating under pressure for fifteen minutes at 160° C. The cured elastomers possessed the following physical properties:

|  | Sample A | Sample B |
| --- | --- | --- |
| Tensile Strength, p.s.i. | 3,125 | 5,075 |
| Elongation at Break, percent | 465 | 480 |
| Load at 300% Elongation, p.s.i. | 1,500 | 2,000 |
| Brittle Temperature, ° C. | −70 | below −76 |
| Hardness | 80 | 90 |

EXAMPLE 15

485 grams of epsilon-caprolactone and 15.5 grams of ethylene glycol were heated at 170° C. under nitrogen and in the presence of 0.05 gram of potassium carbonate for fifty hours. The resulting polyester had a hydroxyl number of 52.8 and a carboxyl number of 1.07.

113 grams of this polyester were mixed with 2.1 grams of ethanolamine and the mixture was heated to 130° C. At this temperature, 21.2 grams of p,p'-diphenylmethane diisocyanate were added and the reactants were stirred until an elastomeric gum stock was obtained.

5% by weight of 4,4'-biphenylene diisocyanate and 0.033% by weight of N,N-dimethylbenzylamine were added to a portion of this gum stock on a rubber mill. The mixture was molded into a disc of 0.07" thickness by heating under pressure for fifteen minutes at 160° C. The resulting elastomer possessed the following physical properties:

Tensile strength, p.s.i. _____ 3650
Elongation at break, percent _____ 475
Load at 300% elongation, p.s.i. _____ 100
Brittle temperature, ° C. _____ −74
Hardness, Shore "A" _____ 60

This example illustrates a modification in which the chain extending agent of stage III is mixed with the polyester, preferably in a ratio of about 0.3 to 1 mol based on the polyester, before the polyester is reacted with the organic diisocyanate of stage II. In this variation of the process the ratio of combined hydroxyl and amino groups of the mixture of polyester and chain-extending agents to the isocyanate groups is preferably the reciprocal of 1–20% or 1/0.8 to 0.99.

It is to be understood that numerous modifications will occur to those skilled in the art upon reading this description. All such modifications are intended to be included within the scope of the invention as defined in the accompanying claims.

We claim:

1. Method which comprises the steps of
I. reacting epsilon-caprolactone, under substantially anhydrous conditions and at a temperature between about 50 and 300° C., with an amount of organic bifunctional initiator having two reactive sites selected from the group consisting of alcoholic hydroxyl, primary amino and secondary amino groups sufficient to form a linear polyester having terminal hydroxyl groups, a hydroxyl number between about 40 and 60, and an acid number not in excess of 10;
II. reacting the said linear polyester with a 30 to 60% molar excess of organic diisocyanate at a temperature up to about 300° C. to form a substantially linear polyester-polyurethane diisocyanate; and
III. reacting the said linear polyester-polyurethane diisocyanate with an amount of a polyfunctional compound in excess of that required for reacting with all of the isocyanate groups of the said linear polyester-polyurethane diisocyanate, said polyfunctional compound being selected from the group consisting of water and organic compounds having at least two reactive sites selected from the group consisting of alcoholic hydroxyl, primary amino, secondary amino, and carboxyl groups to form a millable gum product.

2. The method of claim 1 in which the said millable gum product is cured by reacting it, at a temperature of at least about 100° C., with about 3 to 7% by weight of an organic polyisocyanate based on the weight of the said gum product.

3. The method of claim 1 in which the said millable gum product is cured by reacting it, at a temperature of between about 140 and about 160° C., with about 3 to 7% by weight of an organic polyisocyanate based on the weight of the said gum product.

4. The method of claim 1 in which the step of reacting epsilon-caprolactone with the said organic bifunctional initiator is carried out at a temperature between about 120 and 200° C.

5. The method of claim 1 in which the step of reacting the said linear polyester with a 30 to 60% molar excess of organic diisocyanate is carried out at a temperature between about 100 and about 150° C.

6. The method of claim 1 in which the amount of polyfunctional compound reacted with the said linear polyester-polyurethane diisocyanate is from 1 to 20% in excess of that required for reacting with all of the isocyanate groups of the said polyester-polyurethane diisocyanate.

7. Method which comprises the steps of
I. reacting epsilon-caprolactone, under substantially anhydrous conditions and at a temperature between about 120 and about 200° C., with an amount of organic bifunctional initiator having two reactive sites selected from the group consisting of alcoholic hydroxyl, primary amino and secondary amino groups sufficient to form a substantially anhydrous linear polyester having terminal hydroxyl groups, a hydroxyl number between about 40 and 60, and an acid number not in excess of 10;
II. forming a mixture of the said linear polyester with an organic bifunctional compound having two reactive sites selected from the group consisting of alcoholic hydroxyl, primary amino and secondary amino groups at a temperature between about 100 and about 150° C. in the ratio of 0.3 to one mol of said organic bifunctional compound per mol of said linear polyester;
III. reacting the said mixture with an organic diisocyanate, whereby the ratio of the combined hydroxyl and amino groups of the said mixture to the isocyanate groups is 1/0.8 to 0.99, at a temperature between about 100 and about 150° C. to form a millable gum product; and
IV. curing the gum product by heating it, at a temperature between about 140 and about 160° C., with about 3 to 7% by weight of an organic polyisocyanate based on the weight of the said millable gum product.

8. Method for forming a millable gum product which comprises reacting (1) a linear polyester prepared by reacting epsilon-caprolactone, under substantially anhydrous conditions and at a temperature between about 50 and 300° C., with an amount of organic bifunctional initiator having two reactive sites selected from the group consisting of alcoholic hydroxyl, primary amino and secondary amino groups, said linear polyester having terminal hydroxyl groups, a hydroxyl number between about 16 and 374, and an acid number not in excess of 10, (2) an organic diisocyanate, and (3) a polyfunctional reactant selected from the group consisting of water and organic compounds having at least two reactive sites selected from the group consisting of alcoholic hydroxyl, primary amino, secondary amino and carboxyl groups, the amount of said organic diisocyanate being so selected as to provide a 30 to 60% molar excess over the amount required to react with said linear polyester, said millable gum product containing substantially no free isocyanate groups.

9. Method for forming a polyurethane resin which comprises reacting (1) a linear polyester prepared by reacting epsilon-caprolactone, under substantially anhydrous conditions and at a temperature between about 50 and 300° C., with an amount of organic bifunctional initiator having two reactive sites selected from the group consisting of alcoholic hydroxyl, primary amino and secondary amino groups, said linear polyester having terminal hydroxyl groups, a hydroxyl number between about 40 and 60, and an acid number not in excess of 10, (2) an organic diisocyanate, and (3) a polyfunctional reactant selected from the group consisting of water and organic compounds having at least two reactive sites selected from the group consisting of alcoholic hydroxyl, primary amino, secondary amino and carboxyl groups to form a millable gum product containing substantially no free isocyanate groups, the amount of said organic diisocyanate being so selected as to provide a 30 to 60% molar excess over the amount required to react with said linear polyester, and curing the said millable gum product by reacting it, at a temperature of at least about 100° C., with about 3 to 7% by weight of an organic polyisocyanate based on the weight of said gum product.

10. A product prepared as defined in claim 1.
11. A product prepared as defined in claim 2.
12. A product prepared as defined in claim 3.
13. A product prepared as defined in claim 4.
14. A product prepared as defined in claim 5.
15. A product prepared as defined in claim 6.
16. A product prepared as defined in claim 7.
17. A product prepared as defined in claim 8.
18. A product prepared as defined in claim 9.

References Cited in the file of this patent

UNITED STATES PATENTS

| | | |
|---|---|---|
| 2,149,678 | Hovey et al. | Mar. 7, 1939 |
| 2,153,801 | Hovey et al. | Apr. 11, 1939 |
| 2,389,628 | Martin | Nov. 27, 1945 |
| 2,432,148 | Furness et al. | Dec. 9, 1947 |
| 2,621,166 | Schmidt et al. | Dec. 9, 1952 |
| 2,650,212 | Windemuth et al. | Aug. 25, 1953 |
| 2,729,618 | Muller et al. | Jan. 3, 1956 |

FOREIGN PATENTS

| | | |
|---|---|---|
| 956,245 | France | July 25, 1949 |

OTHER REFERENCES

Ser. No. 397,741, Schlack (A.P.C.), published Apr. 20, 1943.